United States Patent [19]

Hattori et al.

[11] 4,379,403

[45] Apr. 12, 1983

[54] KNOCK DETECTING APPARATUS FOR INTERNAL COMBUSTION ENGINES

[75] Inventors: Tadashi Hattori, Okazaki; Hiroaki Yamaguchi, Anjo; Yoshinori Ootsuka, Okazaki, all of Japan

[73] Assignee: Nippon Soken, Inc., Nishio, Japan

[21] Appl. No.: 185,445

[22] Filed: Sep. 9, 1980

[30] Foreign Application Priority Data

Oct. 18, 1979 [JP] Japan .................. 54-134817
Oct. 25, 1979 [JP] Japan .................. 54-138133

[51] Int. Cl.³ ............................................ G01L 23/22
[52] U.S. Cl. .................................... 73/35; 73/651
[58] Field of Search .................. 73/35, 651; 310/25

[56] References Cited

U.S. PATENT DOCUMENTS

| | | | |
|---|---|---|---|
| 2,219,803 | 10/1940 | Bourne .................. | 73/35 X |
| 2,275,675 | 3/1942 | Draper et al. ............ | 73/35 |
| 2,319,219 | 5/1943 | Draper et al. ............ | 73/35 |
| 2,424,864 | 7/1947 | Treseder .................. | 73/651 |
| 4,275,586 | 6/1981 | Gast et al. ............... | 73/35 |

FOREIGN PATENT DOCUMENTS

555595 8/1943 United Kingdom .................. 73/651

*Primary Examiner*—James J. Gill
*Attorney, Agent, or Firm*—Cushman, Darby & Cushman

[57] ABSTRACT

A knock detecting apparatus includes a vibrating means having a plate reed member adapted to vibrate in response to the vibrations of an internal combustion engine and a support member which is greater in thickness than the reed member and adapted to support the reed member, the reed and support members being made integrally from a magnetic material. When the reed member resonates upon the occurrence of knocking in the engine, the resulting change in the magnetic reluctance of the magnetic path including the reed member is sensed by a sensing coil to thereby detect the knock. The magnetic flux in the magnetic path is generated by a magnet or an excitation coil. An impedance element may be connected to the sensing coil or the excitation coil so as to correct variations in output from one coil to another.

9 Claims, 33 Drawing Figures

KNOCK DETECTING APPARATUS FOR INTERNAL COMBUSTION ENGINES

BACKGROUND OF THE INVENTION

The present invention relates to knock detecting apparatus for detecting the presence of knock in an internal combustion engine.

Known apparatus of the above type are so designed that the vibrations caused in an engine by knocking are sensed by a piezoelectric type acceleration sensor employing a piezoelectric element.

However, the known apparatus of this type has the following disadvantages.

(1) Since the piezoelectric element used has essentially a high impedance, its characteristics tend to be affected by humidity and contamination and thus it is difficult to stably generate small trace knock signals (due to increased drift and vibration variations). Further, since the piezoelectric characteristic of the element is provided by polarization and since the apparatus is used by mounting it to an engine, that is, it is used under severe conditions which cyclically change from high temperature to low temperature conditions, the polarization tends to become gradually lower with a resulting decrease in the sensitivity. The decreased sensitivity results in an increased knock control level and thus it sometimes can cause damage to the engine.

(2) The detecting apparatus must preferably be constructed to reduce the cost as far as possible. However, piezoelectric elements have a high impedance and therefore it is necessary to use an expensive amplifier of the high impedance input type which is called a charge amplifier for amplifying the output signal of the piezoelectric element. Moreover, the high impedance type amplifier tends to malfunction under the effect, for example, of noise due to the ignition signals of the engine, thus requiring a more expensive and complicated construction.

(3) The use of the apparatus as a vehicle-mounted detecting apparatus is disadvantageous from the standpoint of durability, cost, etc., in that the piezoelectric element is inferior with respect to shock resistance, and is subject to cracking and breaking and further requires the use of such means as cooling when the apparatus is used at elevated temperatures.

SUMMARY OF THE INVENTION

With a view to overcoming the foregoing deficiencies in the prior art, it is an object of the present invention to provide an improved knock detecting apparatus having a remarkably improved sensitivity.

In accomplishing the above object, the improved knock detecting apparatus provided in accordance with the present invention includes vibrating means having a plate reed member having a resonance characteristic similar to those frequencies at which knock occurs and a support member greater in thickness than the reed member, the members being made integrally from a magnetic material. A gap is formed adjacent to the reed member, whereby changes in the width of the gap caused by the vibration of the reed member are sensed, and the detection sensitivity to the unavoidable vibrational noise generated from the engine body (e.g., the noise due to the valve seating vibration) is reduced relatively so as to improve the S/N ratio.

It is another object of the invention to provide an improved knock detecting apparatus having a sufficient resistance to severe service conditions on vehicles as well as a high degree of mechanical strength.

To accomplish this object, due to its magnetic knock detection, the apparatus provided in accordance with the invention includes as its component parts a coil, a magnet, etc., which are excellent in environmental resistance and the support for vibrating means is also strengthened.

It is still another object of the invention to provide an improved knock detecting apparatus which is free from the effects of moisture, etc., and excellent in stability against electrical noise such as ignition noise.

To accomplish this object, the apparatus provided in accordance with the invention includes a magnetically sensitive element such as a coil or magneto-resistance element for signal sensing purposes to thereby replace the conventionally used high-impedance piezoelectric element with an entirely different low-impedance sensing means.

DESCRIPTION OF THE PREFERRED EMBODIMENTS

The present invention will now be described in greater detail with reference to the illustrated embodiments.

Figure 1:
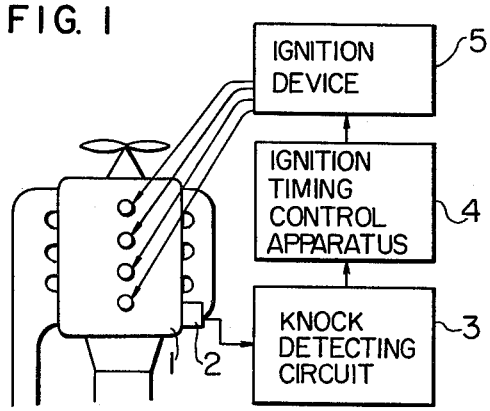
FIG. 1 is a schematic block diagram showing the construction of a knock feedback ignition system incorporating a knock detecting apparatus in accordance with the present invention.

Referring first to FIG. 1, there is illustrated a schematic block diagram showing the construction of a knock feedback ignition system incorporating a knock detecting apparatus according to the present invention. In the Figure, numeral 1 designates an internal combustion engine of the four-cylinder in-line type, and the knock detecting apparatus 2 is mounted to the cylinder block of the engine 1 by means of a screw or the like. Numeral 3 designates a knock detecting circuit for sensing the presence of knock in the engine from the output signal of the knock detecting apparatus 2, and 4 an ignition timing control apparatus responsive to the output of the sensing circuit 3 to advance or retard the ignition timing to the optimum position. The output signal of the control apparatus 4 is applied to the spark plugs mounted in the engine 1 through a known type of ignition device 5 so as to ignite the air-fuel mixture. The knock detecting circuit 3 used in this system is designed to sense the ignition signal which is not shown, so that the noise component caused by the engine vibration is sampled during a predetermined time interval or predetermined degree of crankshaft rotation just after the ignition where there is no occurrence of knock. It is then compared with the output of the sensor generated during a predetermined time interval or a predetermined angle after the top dead center (TDC) or after the peak cylinder pressure where the engine tends to knock (its integrated or averaged value may sometimes be used), thus detecting the presence of knock. Alternatively, the presence of knock may be detected on a statistical basis instead of depending on only a single signal. For example, the presence of knock may be determined in terms of a predetermined percentage of knock events in every 100 times of ignition. In accordance with the presence or absence of knock the ignition timing control apparatus 4 advances or retards the ignition timing. While the knock detecting circuit 3 and the ignition timing control apparatus 4 are of the known type and thus their detailed constructions will not be described, it should be apparent that the detecting apparatus of the invention can be used with any of various types of these detecting circuits and control aparatus so long as they are capable of detecting the presence of knock and controlling the ignition timing.

Next, the knock detecting apparatus 2 will be described in detail. In the first embodiment shown in FIG. 2, numeral 21 designates vibrating means having a plate reed member 21a having a resonance point or frequency within the knocking frequency range from 5 to 10 kHz and a ring support member 21b for supporting the reed member 21a, the members being made integrally from a magnetic material (for example, iron, iron-nickel alloy or magnetic stainless steel such as SUS 430), and one end of the reed member 21a is supported by the support member 21b. The thickness of the support member 21b is made sufficiently greater than that of the reed member 21a. Numeral 22 designates a cylindrical magnet made of alnico, ferrite or the like which has a magnetic force and is magnetized in the longitudinal direction such that a south pole is formed on the upper side and a north pole is on the lower side in FIG. 2. Numeral 23 designates a bar magnetic member of a longitudinally extending cylindrical form which is made of iron, iron-nickel alloy or the like and including at its lower end a collar 23a facing the reed member 21a with a gap formed between it and the reed member 21a. The magnetic member 23 forms the central portion of a magnetic path and its upper end is placed in contact with the north pole of the magnet 22. Numeral 25 designates a coil wound on the bar magnetic member 23 through the intermediary of a resin bobbin 25a to form magnetic flux sensing means. The support member 21b of the vibrating means 21 is placed in close contact with the inner bottom surface of a cup housing 27. Numeral 29 designates a ring spacer made of a nonmagnetic material such as aluminum, copper alloy or nonmagnetic stainless steel and having its lower end placed in close contact with the support member 21b of the vibrating means 21, its intermediate portion disposed to support the collar 23a of the bar magnetic member 23 and its upper end disposed to support both the collar 23a and the bobbin 25a. Since the spacer 29 is made of nonmagnetic material, it is designed in an optimum manner such that its magnetic reluctance has a sufficiently large effective value which is close to that of an air gap. The housing 27 has its peripheral wall formed into substantially a cylindrical shape and it is made of a magnetic material such as iron or iron-nickel alloy. The housing 27 includes in the lower part a threaded portion 27a for attaching the apparatus to the engine cylinder block and a wrench hexagon portion 27d for screwing the housing 27 into the engine block by means of the threaded portion 27a. Of these components, the vibrating means 21, etc., which are made of magnetic material and which tend to be rusted may sometime be plated with a magnetic material such as nickel or cobalt. Numeral 28 designates a sealing plate for hermetically sealing the detecting apparatus to protect the same from the atmospheric humidity, contamination and the like. The sealing plate 28 which forms part of the magnetic path, is made of a magnetic material, is driven or fitted into the open end of the housing 27 and is held in place by caulking a caulking portion 27b on the open end of the housing 27 with a sealing O-ring 26a interposed therebetween. Firmly fitted in the plate 28 is a hermetic seal 28a having signal delivery terminals 28b firmly embedded therein. The output terminals of the coil 25 are connected to the terminals 28b of the hermetic seal 28a through which they are connected to external signal lines 31. Numeral 32 designates a rubber bushing covering the joint of the terminals 28b and the signal lines 31, and 26b an O-ring interposed between the plate 28 and the bobbin 25a. In this case, the lower end of the plate 28 is kept in close contact with the south pole of the magnet 22 and moreover the interior of the housing 27 except the vicinity of the vibrating means 21 is, if necessary, filled with a molding resin or fastened in place by means of an adhesive to thereby prevent any change in the linking magnetic flux due to a change in the position of the magnet 22, the coil 25 and the bar magnetic member 23 relative to each other. Numerals 251 and 252 designate slit grooves formed in the bobbin 25a so as to bring the ends of the coil 25 to the outside, and 281 and 282 slit grooves formed in the plate 28 to bring the ends of the coil 25 to the outside. With this detecting apparatus, the magnetic path is formed by the north pole of the magnet 22, the bar magnetic member 23, the gap G, the vibrating means 21, the housing 27, the plate 28 and the south pole of the magnet 22.

With the construction described above, the operation of the first embodiment is as follows. As mentioned previously, the detecting apparatus 2 is mounted to the engine cylinder block by firmly screwing the threaded portion 27a thereinto. The knock-induced vibrations in the cylinder block are transmitted to the vibrating means 21 by way of the housing 27. Since the reed member 21a of the vibrating means 21 has its one end firmly secured to the housing 27 by means of the support member 21b, the reed member 21a vibrates in accordance with the frequency and intensity of the vibrations as well as the natural frequency of the reed member 21a itself. In this case, since all the components except the reed member 21a are firmly held in place so as to move along with the housing 27, the reed member 21a alone vibrates in the magnetic path so that the gap G varies and the magnetic reluctance of the magnetic path varies, thus causing the coil 25 to generate a voltage output corresponding to the magnetic flux change. This signal is applied to the sensing circuit 3 (FIG. 1) through the terminals 28b provided in the hermetic seal 28a and through the two signal lines 31. While all the magnetic flux produced by the magnet 22 does not pass through the magnetic path (due to the leakage of some flux to the outside), the materials and spacings of the respective components are suitably selected so that the leakage flux is sufficiently small as compared with the magnetic flux passing through the magnetic path and thus there will be no difficulty in performing the detection. The resonance frequency of the reed member 21a is adjusted to coincide with the knocking frequency (e.g., substantially the intermediate value of 5 to 10 kHz or 8 kHz) so that the knock detecting sensitivity is particularly improved at this frequency and the sensitivity to signals of other frequency bands is relatively deteriorated with the resulting improvement of the S/N ratio in the knock detection. In this case, by increasing the thickness of the support member 21b of the vibrating means 21 as compared with that of the reed member 21a, the strength of the support member 21b is increased and the Q of the resonance characteristic of the reed member 21a is increased.

Figure 3A:
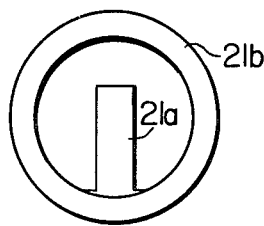
FIGS. 3A and 3B, 4A and 4B, 5A and 5B, 6A and 6B, 7A and 7B, 8A and 8B, 9A and 9B, 10A and 10B, 11, 12, and 13A and 13B are a plan view and longitudinal sectional view of different embodiments of the vibrating means used in the detecting apparatus shown in FIG. 2.
Figure 3B:
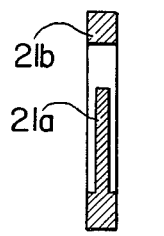
Figure 4A:
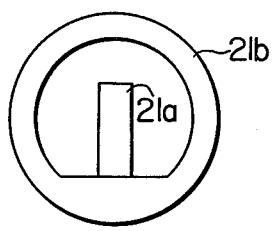
Figure 4B:
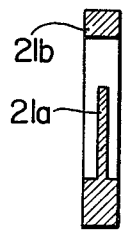
Figure 5A:
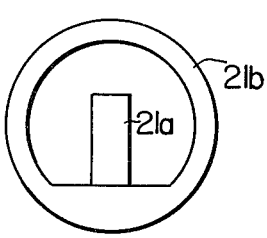
Figure 5B:
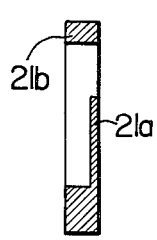

Next, eleven exemplary constructions of the vibrating means 21 used in the detecting apparatus shown in FIG. 2 will be described with reference to FIGS. 3A and 3B to 13A and 13B. In FIGS. 3A and 3B, the width of the joining portion of the reed member 21a to the support member 21b is increased perpendicularly and the reed member 21a is extended from the axially central portion of the support member 21b toward the center thereof. In FIGS. 4A and 4B, the joining portion of the support member 21b to the reed member 21a is made rectilinear and this has the effect of making the supporting point of the reed member 21a more apparent. The vibrating means of FIGS. 5A and 5B differs from that of FIGS. 4A and 4B in that the reed member 21a is extended from the axial end face of the support member 21b toward the center thereof so as to simplify the manufacturing process. The vibrating means of FIGS. 6A and 6B differs from that of FIGS. 5A and 5B in that a plurality of the reed members 21a are extended from the support member 21b toward the center thereof so that by using the reed members 21a of different lengths, it is possible to obtain the resonance characteristics with respect to a plurality of frequencies.

Figure 6A:
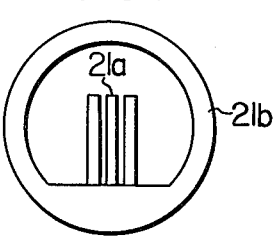
Figure 6B:
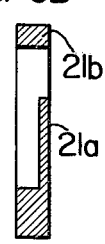
Figure 7A:
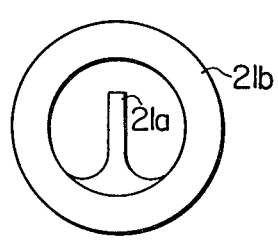
Figure 7B:
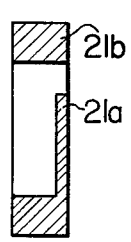
Figure 8A:
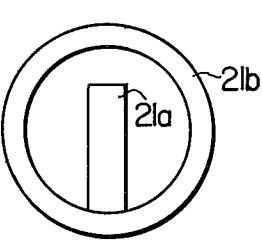
Figure 8B:
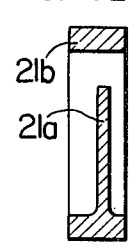

In FIGS. 7A and 7B, the vibrating means 21 is constructed so that the joining portion of the reed member 21a to the support member 21b is gradually increased in width. In FIGS. 8A and 8B, the vibrating means is formed so that the joining portion of the reed member 21a to the support member 21b is gradually increased in thickness. By increasing the thickness of the support member 21b sufficiently as compared with the reed member 21a, it is possible to firmly support the reed member 21a on the support member 21b so that the supporting point of the reed member 21b is substantially fixed and this substantially fixed supporting point has the effect of making the vibrating means close to an ideal vibrating member and thereby increasing the Q value up to 50 to 70 decibels. While such an increased Q value is idealistic from the standpoint of improving the S/N ratio, a difficulty exists with respect to the frequency response to knocking. Assuming now that l represents the vibrating length of the vibrating means and h its thickness, its resonance frequency $f_o$ is substantially proportional to $h/l^2$. As a result, if the vibrating means 21 is shaped as shown in FIGS. 7A and 7B or FIGS. 8A and 8B so that the supporting point of the reed member 21a varies in accordance with the intensity of vibrations, the vibrating length of the reed member 21a becomes effectively variable thus reducing the Q value to as low as 30 to 40 dB. This construction can be applied similarly to one including a plurality of reed members as shown in FIGS. 6A and 6B.

Figure 9A:
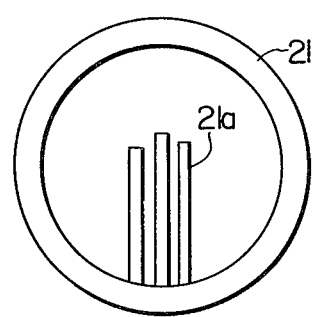
Figure 9B:
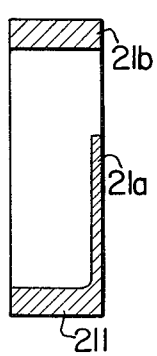
Figure 10A:
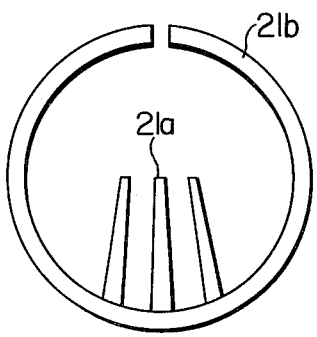
Figure 10B:
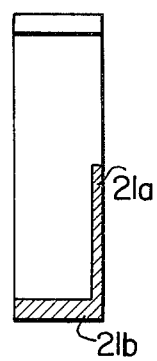
Figure 11:
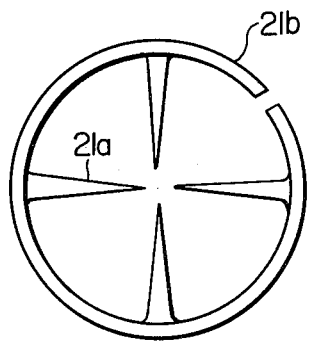
Figure 12:
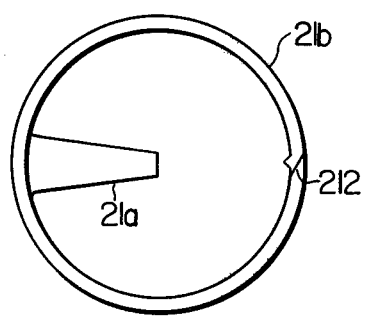
Figure 13A:
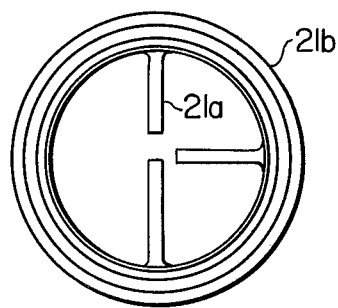
Figure 13B:
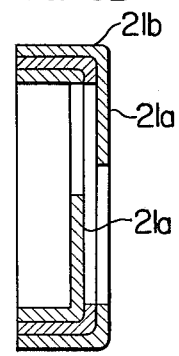

In accordance with these exemplary forms, the vibrating means 21 is formed by machining which requires much machining time. An exemplary method of preparing the vibrating means 21 by pressing or the like in a short period of time will now be described. FIGS. 9A and 9B show one embodiment in which a plurality of reed members 21a of different lengths are made integral with a support member 21b. Its manufacturing method comprises plastically deforming by pressing a cylindrical magnetic blank material to form a ring support member 21b and a reed member forming plate portion extending over the entire end face of the support member 21b and then removing by stamping all of the reed member forming plate except those portions forming reed members 21a thus providing a vibrating means as shown in FIGS. 9A and 9B. In this case, an outer corner 211 must be formed as an angle which is as close to a right angle as possible so that when assembling the space between the support member 21b and the spacer 29 is decreased so as to reduce the strain which will be produced in the vibrating means 21 when the caulking portion 27b of the housing 27 is caulked. FIGS. 10A and 10B show one embodiment in which a plurality of reed members 21a are formed altogether, and its manufacturing method comprises first stamping out a plate magnetic blank material to produce a support member 21b and reed members 21a which are in expanded form and then simultaneously effecting, by pressing, the conversion of the support member 21 into a cylindrical form and the bending of the reed members 21a, thus producing a vibrating means as shown in FIGS. 10A and 10B. FIG. 11 shows a vibrating means including a plurality of reed members 21a formed on the periphery of a support member 21b substantially equally spaced, and its manufacturing method comprises first stamping out a plate magnetic blank material to provide a support member 21b and reed members 21b which are in expanded form, forming the support member 21b into cylindrical shape and then inwardly blending the reed members 21a, thus manufacturing a vibrating means as shown in FIG. 11. FIG. 12 shows a vibrating means produced by forming a reed member 21a and a support member 21b by the same manufacturing method as in the case of FIGS. 10A and 10B or FIG. 11 and then joining mating portions 212 of the support member 21b together by welding. FIG. 13 shows a vibrating means manufactured by putting together a plurality of support members 21b each having an integral reed member 21a, and its manufacturing method comprises first forming by drawing a plurality of cup members of different diameters from circular magnetic blank materials, removing by stamping the bottom plate of each of the cup members except a portion substantially necessary for forming a reed member 21a to form a plurality of support members 21b each having an integral reed member 21a and different diameters and then placing the support members 21b one upon another by force fitting.

Figure 14:
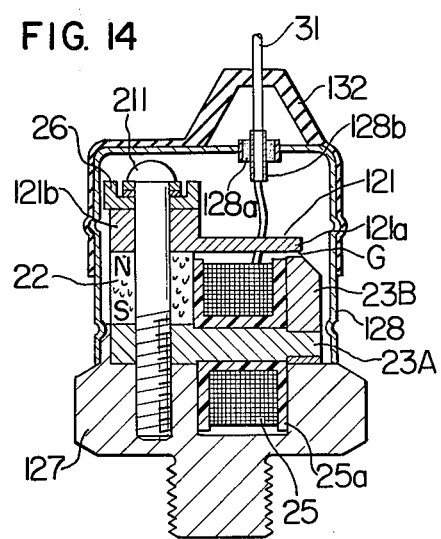
FIG. 14 is a longitudinal sectional view showing a second embodiment of the detecting apparatus according to the invention.
Figure 15A:
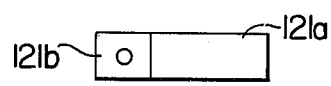
FIGS. 15A and 15B, and 16A and 16B are, respectively, a plan view and front view showing different embodiments of the vibrating means used in the detecting apparatus of FIG. 14.
Figure 15B:
Figure 16A:
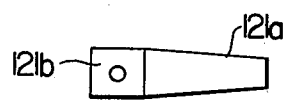
Figure 16B:
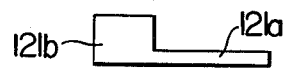

FIG. 14 shows a second embodiment of the knock detecting apparatus including bar magnetic members 23A and 23B combined by force fitting into and L shape to form a magnetic path, a coil 25 wound on the bar magnetic member 23A through the intermediary of a bobbin 25a, a magnet 22 disposed on one end of the bar magnetic member 23a, a vibrating means 121 including a square post support member 121b disposed on the magnet 22 and a reed member 121a having its one end positioned to face the bar magnetic member 23B through a gap G, and a keep plate 26 placed on the support member 121b. The bar magnetic member 23a, the magnet 22, the support member 121b of the vibrating means 121 and the keep plate 26 are firmly secured to a housing 127 of non-magnetic material by a screw 211. Numeral 121 designates a cover secured to the housing 127, which is shaped so as to cover the component parts. Fixedly mounted in the cover 128 is a hermetic seal 128a and the ends of the coil 25 are connected to signal lines 31 through terminals 128b. Numeral 132 designates a rubber cap fitted on the cover 128. The vibrating means 121 is shaped as shown in FIGS. 15A and 15B or FIGS. 16A and 16B, and in this embodiment the support member 121b is also made sufficiently greater in thickness than the reed member 121a such that the reed member 121a is firmly supported by the support member 121b.

The embodiment shown in FIG. 14 is also designed so that when the reed member 121a vibrates in response to the vibrations due to knocking, the gap G is varied and this variation of the gap G results in variation of the magnetic flux passing through the coil 25 causing it to generate an output corresponding to the knock-induced vibrations.

While, in the above-described embodiments of the detecting apparatus, the magnetic sensing means comprises a coil, a magneto-resistance element or a Hall device may also be used in place of it.

Further, in the above-described embodiments the vibrating means 21 and 121 may each be produced by first forming a magnetic blank material into the illustrated final shape by stamping, pressing, machining or the like and then subjecting the same to a surface treatment such as barrel polishing to reduce the internal stress, thereby more positively preventing any change in the properties of the vibrating means 21 or 121, its breaking, loosening or the like due to the vibration and improving its durability.

Further, by forming a vibrating means into a shape such that the joining portion of a reed member to a support member is increased gradually in width or thickness, it is possible to control the value of Q at the resonance frequency as desired.

Figure 17:
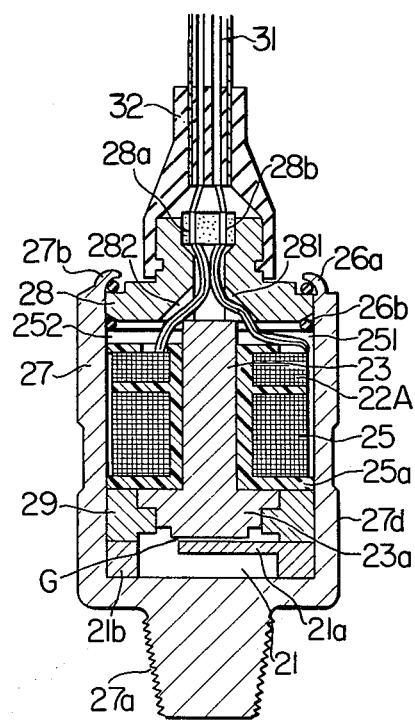
FIG. 17 is a longitudinal sectional view showing a third embodiment of the detecting apparatus according to the invention.

Referring now to FIG. 17, there is illustrated a third embodiment of the detecting apparatus in accordance with the invention. This third embodiment differs from the first embodiment of FIG. 2 in that the magnet 22 is replaced with an excitation coil, and the same reference numerals as used in FIG. 2 designate components which are the same or equivalent to the counterparts of FIG. 2. In FIG. 17, numeral 22A designates an excitation coil forming magnetic flux generating means, and it is wound on the resin bobbin 25a holding therein the sensing coil 25 forming a magnetic flux sensing means.

Figure 18:
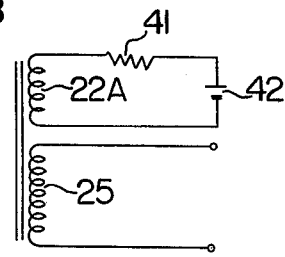
FIG. 18 is a circuit diagram of the detecting apparatus shown in FIG. 17.

FIG. 18 shows the circuit construction of the knock detecting apparatus 2, in which the excitation coil 22A is connected to a DC power source 42 through a resistor 41 forming an impedance element or output adjusting means, and the resistance value of the resistor 41 is adjusted (e.g., the resistor 41 is comprised of a resistor having a predetermined resistance value or a variable resistor whose resistance value is adjusted suitably) so as to adjust the current supplied to the excitation coil 22A from the DC power source 42 and thereby to correct variations in the output of the sensing coil 25 among different detecting apparatus. The resistor 41 is integrally mounted inside the detecting apparatus case formed by the housing 27 and the plate 28 or it is connected externally of the detecting apparatus case.

Figure 2:
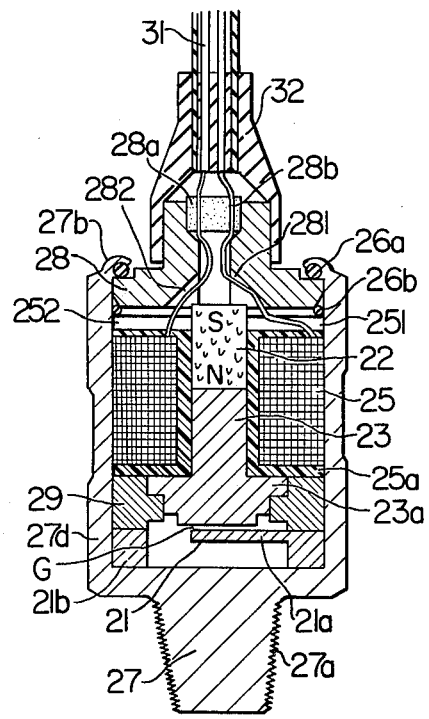
FIG. 2 is a longitudinal sectional view showing a first embodiment of the detecting apparatus according to the apparatus.
Figure 19:
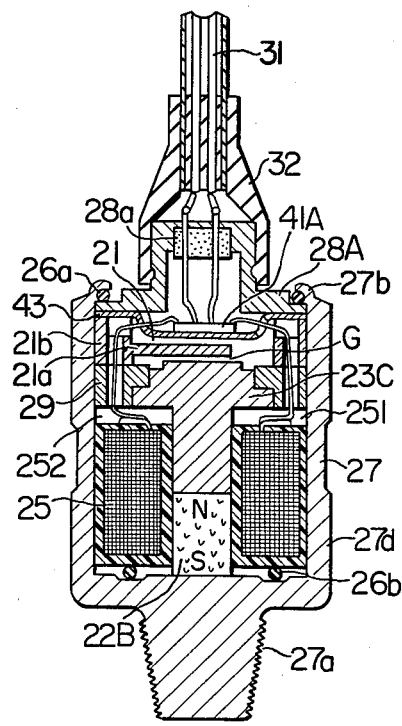
FIG. 19 is a longitudinal sectional view showing a fourth embodiment of the detecting apparatus according to the invention.

FIG. 19 shows a fourth embodiment of the detecting apparatus according to the invention, which differs from the first embodiment of FIG. 2 in that the vibrating means 21 is located in the upper part of the housing 27, that a cylindrical magnet 22B is used which is magnetized in the longitudinal direction and forming a magnetic flux generating means and that the magnetic member 23 is replaced with a bar magnetic member 23C which is reduced in length by an amount corresponding to the length of the magnet 22B. Also, fixedly mounted in the open end of the housing 27 is a sealing plate 28A of a nonmagnetic material (or it may be made of a magnetic material) and held between the plate 28A and the support member 21b of the vibrating means 21 is the peripheral portion of an insulating sheet 43 on which is fixedly mounted an impedance means 41A connected to the sensing coil 25 so as to integrally incorporate it within the detecting apparatus case.

Figure 20A:
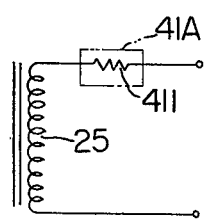
FIGS. 20A, 20B and 20C are circuit diagrams showing different embodiments of the electric circuit construction of the detecting apparatus shown in FIG. 19.
Figure 20B:
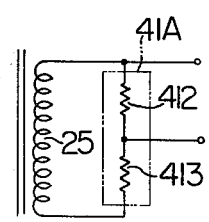
Figure 20C:
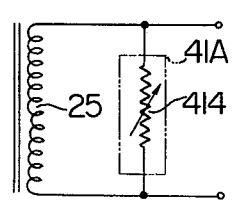

FIGS. 20A, 20B and 20C show three exemplary forms of the electric circuit for the detecting apparatus shown in FIG. 19. In FIG. 20A, the impedance means 41A comprises a resistor 411 connected in series with the sensing coil 25, and in FIG. 20B the impedance means 41A comprises resistors 412 and 413 which are connected between the terminals of the sensing coil 25 so as to deliver the voltage across the terminals of the resistor 412. In FIG. 20C, the impedance means 41A comprises a variable resistor 414 connected between the terminals of the sensing coil 25. In each of these circuit constructions, the resistance value of the resistor 411, 412 and 413 or 414 is adjusted so as to directly adjust the output of the sensing coil 25 and thereby to correct variations in the output of the sensing coil 25 among different detecting apparatus.

With the detecting apparatus shown in FIG. 19, if a band-pass filter is provided so as to apply to the knock detecting circuit 3 only those outputs of the sensing coil 25 whose frequencies are within the knocking frequency band, this band-pass filter may be constructed, along with the impedance means 41A, as an integrated circuit so as to fixedly mount the same on the insulating sheet 43 and thereby to integrally incorporate the band-pass filter within the detecting apparatus case.

Also, in the embodiments shown in FIGS. 17 and 19, the sensing coil 25 forming a magnetic flux sensing means may be replaced by, for example, a magneto-resistance element or a Hall device.

Still further, in the above-described third and fourth embodiments the vibrating means 21 may be produced by first forming, by stamping or pressing (or machining), a blank magnetic material into the final shape shown in FIG. 17 or 19 and then subjecting the same to a surface treatment such as barrel polishing so as to reduce the internal stress, thereby more positively preventing any property change, breakage loss or the like of the vibrating means 21 due to vibration and further improving its durability.

We claim:

1. A knock detecting apparatus for internal combustion engines comprising:

vibrating means attached to an engine, including at least one reed member made of a magnetic material and adapted to vibrate in response to vibrations of said engine, and a support member which is greater in thickness than said reed member and adapted to support said reed member, said reed member having a resonance characteristic corresponding to a knocking frequency of said engine;

magnetic path forming means disposed adjacent to said reed member to form a magnetic path therewith and define a gap therebetween;

magnetic flux generating means including an excitation coil;

output adjusting means including impedance means for adjusting the supply of current to said excitation coil; and magnetic flux sensing means disposed adjacent to said magnetic path to sense changes in the magnetic relunctance of said magnetic path caused by changes in the width of said gap due to vibrations of said reed member.

2. A knock detecting apparatus for internal combustion engines, comprising:

vibrator means including at least one reed member and a ring-shaped support member, said reed member being projected from an inner wall of said ring-shaped support member toward the center thereof, both of said reed member and said support member being made as a unitary body of a magnetic material, said reed member having a resonance characteristic corresponding to a knocking frequency of an engine;

a bar-shaped magnetic core having one end being located adjacent to but spaced from said reed member to form an air gap therebetween;

a cup-shaped housing of a magnetic material for accommodating said vibrator means and said bar-shaped magnetic core so that said support member of said vibrator means is fixed to an inside surface of said cup-shaped housing;

magnetic flux generating means for generating magnetic flux through a magnetic path formed by said bar-shaped magnetic core, said air gap, said reed member, said support member and a side wall of said cup-shaped housing, said magnetic flux generating means including an excitation coil for generating controllable magnetic flux; and magnetic flux sensing means disposed adjacent to and coupled with said magnetic path to sense changes in the magnetic reluctance of said magnetic path caused by changes in the width of said gap due to vibrations of said reed member.

3. An apparatus according to claim 2, wherein said reed element is shaped such that said reed member is gradually increased in width in a portion thereof connected to said support member.

4. An apparatus according to claim 2, wherein said reed member is shaped such that said reed member is gradually increased in thickness in a portion thereof connected to said support member.

5. An apparatus according to claim 2, wherein said vibrating means is formed through plastic deformation produced by pressing.

6. An apparatus according to claim 2, wherein said vibrating means is made by bending a magnetic sheet material such that said reed member and said support member are integrally formed.

7. An apparatus according to claim 2, wherein said vibrating means is subjected to a surface reinforcing treatment.

8. An apparatus according to claim 2, wherein said magnetic flux sensing means includes a sensing coil, and said knock detecting apparatus further comprises output adjusting means including impedance means connected to said sensing coil.

9. An apparatus according to claim 2, wherein said magnetic flux generating means includes a magnet.

* * * * *